(12) United States Patent
Crews et al.

(10) Patent No.: US 9,368,003 B2
(45) Date of Patent: Jun. 14, 2016

(54) AUTOMATED BANKING MACHINE THAT IS OPERABLE RESPONSIVE TO DATA BEARING RECORDS

(71) Applicant: Diebold Self-Service Systems division of Diebold, Incorporated, North Canton, OH (US)

(72) Inventors: Timothy Crews, Alliance, OH (US); Grant Thornberry, Louisville, OH (US); Songtao Ma, Wadsworth, OH (US); Darla Rowland, Akron, OH (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 9 days.

(21) Appl. No.: 14/120,363

(22) Filed: May 14, 2014

(65) Prior Publication Data
US 2014/0339303 A1 Nov. 20, 2014

Related U.S. Application Data

(60) Provisional application No. 61/822,949, filed on May 14, 2013.

(51) Int. Cl.
*G06Q 40/00* (2012.01)
*G07F 19/00* (2006.01)
*G06Q 10/00* (2012.01)

(52) U.S. Cl.
CPC .............. *G07F 19/209* (2013.01); *G06Q 10/20* (2013.01); *G07F 19/20* (2013.01); *G07F 19/206* (2013.01)

(58) Field of Classification Search
USPC ....................... 235/379, 381; 705/43
See application file for complete search history.

(56) References Cited

U.S. PATENT DOCUMENTS

| 8,118,217 B1* | 2/2012 | Ma et al. .................. 235/379 |
| 2006/0151597 A1* | 7/2006 | Scanlon .................. 235/379 |
| 2010/0063776 A1 | 3/2010 | Kayani | |

FOREIGN PATENT DOCUMENTS

| EP | 1 672 595 A1 | 6/2006 |
| WO | WO 2002/054223 | 11/2002 |
| WO | WO 2004/061787 | 7/2004 |
| WO | WO 2004/114056 | 12/2004 |

* cited by examiner

*Primary Examiner* — Ahshik Kim
(74) *Attorney, Agent, or Firm* — Black McCuskey Souers & Arbaugh, LPA

(57) ABSTRACT

In an example embodiment, an automated banking machine that operates responsive at least in part to data read from data bearing records. The automated banking machine including a transaction function device, a slot associated with the transaction function device, an indicator adjacent to the slot, the indicator includes at least three different color light emitting diodes (LEDs), and an indicator processor in operative connection with the indicator. The indicator processor is operable to cause the LEDs of the indicator to intermittently illuminate to produce a plurality of blended colors that correspond to a functional status of the transaction function device.

56 Claims, 3 Drawing Sheets

AUTOMATED BANKING MACHINE THAT IS OPERABLE RESPONSIVE TO DATA BEARING RECORDS

CROSS REFERENCE TO RELATED APPLICATIONS

This application claims the benefit under 35 U.S.C. §119 of U.S. Provisional Application No. 61/822,949 filed May 14, 2013, the disclosure of which is hereby incorporated by reference in its entirety.

This application is a related to U.S. application Ser. No. 13/405,667 filed Feb. 27, 2012, now U.S. Pat. No. 8,534,537, which is a continuation of U.S. application Ser. No. 12/583,886 filed Aug. 27, 2009, now U.S. Pat. No. 8,123,122, which is a continuation of U.S. application Ser. No. 12/070,984 filed Feb. 22, 2008, now U.S. Pat. No. 7,617,971, which is a divisional of U.S. application Ser. No. 11/504,478 filed Aug. 15, 2006, now U.S. Pat. No. 7,334,723, which is a continuation of U.S. application Ser. No. 10/722,067 filed Nov. 25, 2003, now U.S. Pat. No. 7,104,441, which claims the benefit of U.S. Provisional Applications: 60/429,249 and 60/429,250 filed Nov. 25, 2002; 60/429,476, 60/429,521, and 60/429,528 filed Nov. 26, 2002; 60/453,370 filed Mar. 10, 2003; and 60/465,733 filed Apr. 25, 2003. This application is related to U.S. application Ser. No. 14/408,674 filed on Oct. 8, 2013, published as U.S. PG Publication No. 2014/0107836, that claims the benefit of U.S. Provisional application 61/710,997. The disclosures of these aforementioned applications are herein incorporated by reference in their entirety.

TECHNICAL FIELD

This disclosure relates to banking system machines that operate responsive to data read from data bearing records such as user cards.

BACKGROUND

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts, account balance inquiries, the payment of bills, the cashing of checks, the purchase of money orders, the purchase of stamps, the purchase of tickets, and the purchase of phone cards. The types of banking transactions a customer can carry out at an automated banking machine are determined by the capabilities of the particular banking machine, the capabilities of the system in which it is connected, and the programming of the machine by the entity responsible for its operation.

Other types of automated banking machines may be operated in other types of environments. For example certain types of automated banking machines may be used in a customer service environment, such as by service providers in a transaction environment (such as a bank) to carry out financial transactions. For example, certain types of automated banking machines may be used for purposes of counting and storage of currency notes, other financial instrument sheets, or other items that are received from or which are to be given to a customer, the dispensing of notes or other sheets, the imaging of checks or other financial instruments, and other types of transactions. Other types of automated banking machines may be used to validate items which provide the customer with access, value, or privileges, such as tickets, vouchers, checks, or other financial instruments. Other examples of automated banking machines may include machines which are operative to provide users with the right to merchandise or services in an attended or a self-service environment.

Some types of automated banking machines may be operated by merchants to carry out commercial transactions. These transactions may include, for example, the acceptance of deposit bags, the receipt of checks or other financial instruments, the dispensing of rolled coin, or other transactions required by merchants.

A common type of self-service automated banking machine used by consumers or customers is an automated teller machine ("ATM"). For purposes of this disclosure an automated banking machine, automated transaction machine, or an automated teller machine shall be deemed to include any machine that can be operated to automatically carry out transactions involving transfers of value.

Automated banking machines may include various types of transaction function devices. These devices are operated to carry out transactions. Different types of automated banking machines include different types of devices. Different types of devices enable an automated transaction machine to carry out different types of transactions. For example, some types of automated machines include a depository for accepting deposits while other automated machines do not. Some machines have a "touch screen" while others have separate displays and input buttons. Automated banking machines can also be fitted with devices such as cash and coin acceptors, statement printers, check validators, currency bill or note acceptors, thumb print readers, and other types of devices, while other machines do not include such devices.

OVERVIEW OF EXAMPLE EMBODIMENTS

In accordance with an example embodiment, there is disclosed herein an automated banking machine that operates responsive at least in part to data read from data bearing records. The automated banking machine including a transaction function device, a slot associated with the transaction function device, an indicator adjacent to the slot, the indicator includes at least three different color light emitting diodes (LEDs), and an indicator processor in operative connection with the indicator. The indicator processor is operable to cause the LEDs of the indicator to intermittently illuminate to produce a plurality of blended colors that correspond to a functional status of the transaction function device.

DETAILED DESCRIPTION OF EXAMPLE EMBODIMENTS

Figure 1:
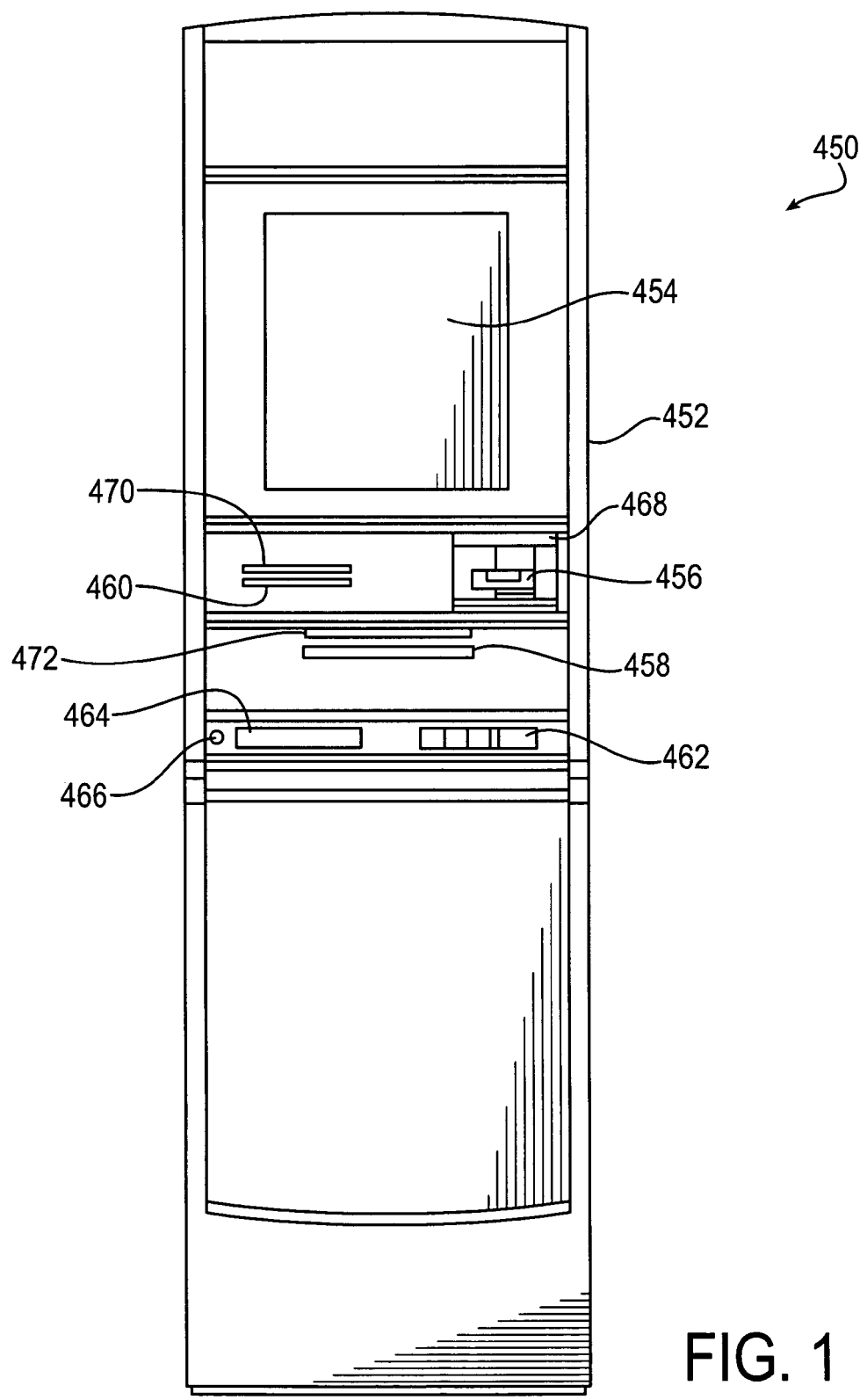
FIG. 1 shows a plan view of an alternative automated banking machine.

Referring now to the drawings and particularly to FIG. 1, there is illustrated an example of an automated banking machine 450. Machine 450 is a machine that operates in response to data read from user cards and is operative to cause financial transfers to or from financial accounts. It should be understood, however, that machine 450 is but one example of many types of automated banking machines to which the features described herein may be applied.

Machine 450 includes a housing 452. Housing 452 is operative to support a number of devices that are used in connection with the functions performed by the machine. The example machine includes a touch screen display 454. Display 454 is used as both an output and an input device in the embodiment. Display 454 can be used to provide users with instructions for operation of the machine, as well as graphical representations of selections or options that users may select and thereby provide inputs to the machine. In an example embodiment, the machine 450 further includes a card reader which is operative to read cards such as credit or debit cards. The card reader is coupled with a card reader slot 456 through which user cards pass during operation of the machine. Card readers of embodiments may read magnetic stripe cards, chip cards, wireless cards or other types of articles from which data corresponding to user accounts may be read.

In an example embodiment, the machine 450 further includes an opening 458. Opening 458 is associated with one or more devices within the machine. The transaction function devices associated with opening 458 may include, for example, a sheet dispenser such as a dispenser of cash in the form of currency bills. Alternatively opening 458 may be associated with a transaction device that prints coupons, scrip, tickets, traveler's checks or other sheet items that are delivered through the opening 458 to users of the machine. Alternatively opening 458 may be associated with transaction function devices that receive sheets from users of the machine. This may include, for example, check acceptors that receive, image and analyze financial checks input to the machine by machine users. Alternatively or in addition opening 458 may be associated with a transaction function device in the form of a bill validator which is operative to validate bills received through the opening. In still further alternative arrangements opening 458 may be associated with a transaction function device that operates as a currency recycler. The currency recycler may receive currency sheets from users, validate them as genuine and store genuine currency notes in the machine for later dispensing to users who request cash from the machine. Of course these transaction function devices are example and in other embodiments other types of devices may be used.

In an example embodiment, the machine 450 further includes a receipt opening 460. Receipt opening 460 is associated with a receipt printer in the example machine. The receipt printer operates to provide the user with a receipt for transactions conducted at the machine. The embodiment further includes a keypad 462. Keypad 462 serves as a user input device to receive inputs from users of a machine. Such inputs may include alphanumeric inputs, transaction selection inputs or other types of inputs as are required in operation for the machine. The example keypad may include alphanumeric keys, function keys or other suitable keys that users can manually contact to provide inputs that will cause desired operation of the automated banking machine.

In an example embodiment, the machine 450 further includes an auxiliary touch screen display 464. Auxiliary display 464 may be like that described in U.S. patent application Ser. No. 13/687,023 filed Nov. 28, 2012 the disclosure of which is incorporated herein by reference in its entirety. The auxiliary display 464 may include a touch screen display that is usable by individuals in wheelchairs or that otherwise prefer to operate the machine and provide inputs through the auxiliary display which is more readily shielded from observation by unauthorized persons. The example machine further includes a port 466. Port 466 of the embodiment may include a headphone jack. The headphone jack may be utilized by persons who are blind and who may operate the machine in response to audible instructions provided through connection of headphones to the headphone jack. In other embodiments the port 466 may include a wireless port which enables near distance wireless communication between the machine and a device carried by a user. This may include, for example, a wireless headphone arrangement that enables a person operating the machine in response to voice guidance inputs received through headphones to receive machine operation instructions through the wireless port. Alternatively or in addition the port 466 may communicate with a mobile wireless device such as a smart phone. Such communication with a smart phone may enable a user to provide inputs and/or receive outputs from the machine using a smart phone or other portable wireless device. It should be understood that these devices of machine 450 are example and in other types of automated banking machines, other types of devices may be utilized in connection with machine operation.

In an example embodiment, the machine 450 includes a plurality of visual indicators 468, 470, 472. The visual indicators 468, 470, 472 will selectively provide outputs that can be visually observed by users and which are controlled to facilitate operation of the machine. In particular embodiments, a visual indicator 468 is positioned adjacent to the card slot 456. Another visual indicator 470 is positioned adjacent to the receipt opening 460. Yet another visual indicator 472 is positioned adjacent to the opening 458. Of course it should be understood that these are mere examples and other types of automated banking machines may include greater or lesser numbers or other types of indicators.

Visual Indicators 468, 470 and 472 may operate to selectively illuminate at times before, during and after transactions in order to facilitate user operation of the machine. Some indicators, arrangements and the associated banking machine may include features such as those described in U.S. Pat. No. 7,677,444 the disclosure of which is incorporated herein by reference in its entirety.

Figure 2:
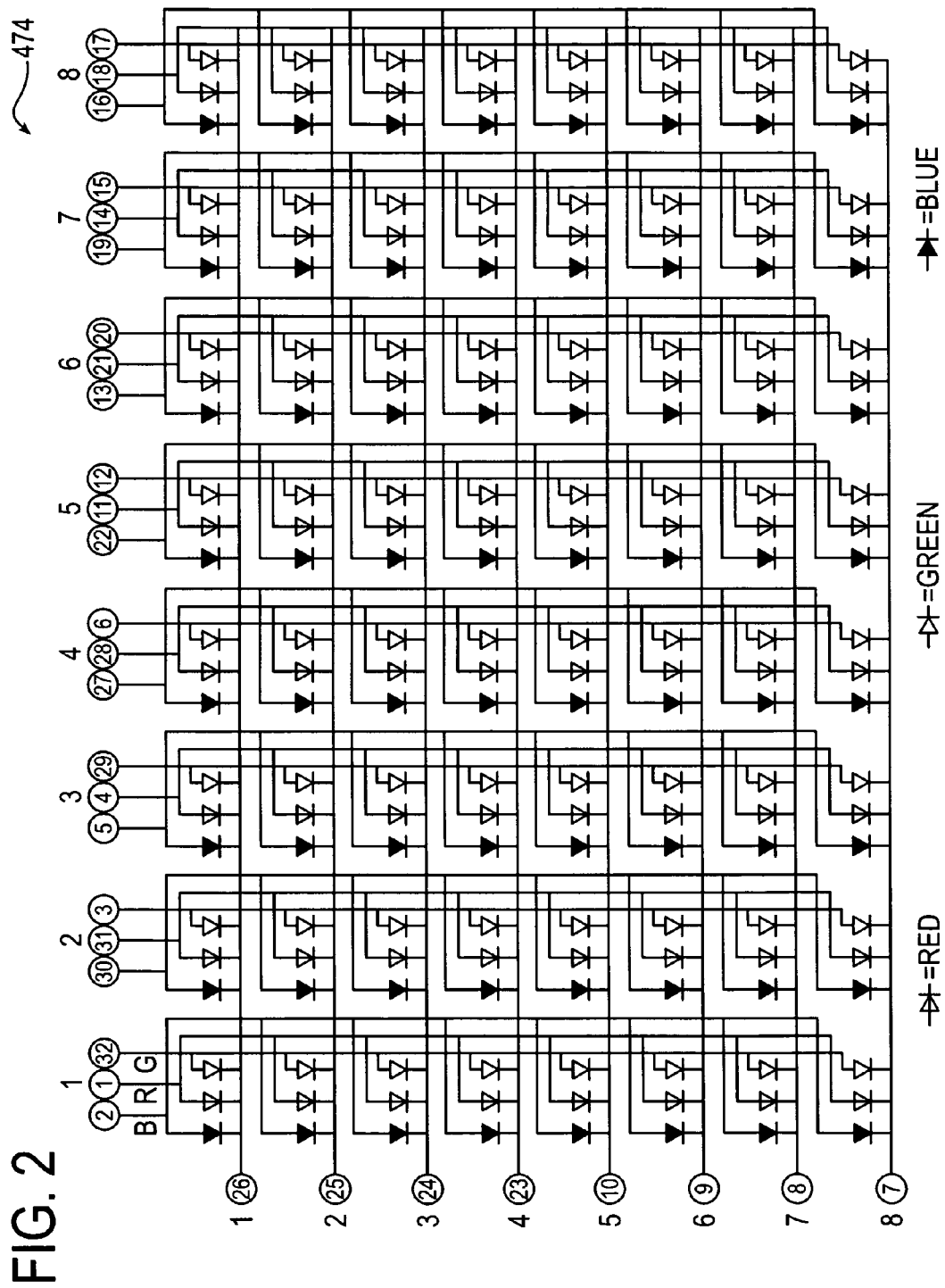
FIG. 2 shows a schematic view of an LED array that may be used in connection with indicators utilized in connection with an automated banking machine.

In an example embodiment, the visual indicators 468, 470, 472 are comprised of multiple light emitting diodes (LEDs). For example in some embodiments, the indicators may include a matrix of multicolor LEDs such as matrix 474 shown in FIG. 2. The example LED matrix 474 includes a pattern of at least three different color LEDs. In the matrix shown in FIG. 2 the LEDs are red, green and blue. It should be understood, however, that in other embodiments other colors of LEDs or additional colors may also be used. For example in some embodiments the LEDs may include a red, green and yellow matrix. In addition, additional LEDs having different colors such as white may also be included in the matrix. Of course it should be understood that in still other embodiments two different colors of LEDs may be used, or greater numbers of different color LEDs. Further, it should be understood that while LEDs are described in the embodiments, other embodiments may use different types of light emitters.

In the example embodiment, the matrix 474 the LEDs span a significant length and width of the area of the matrix. This enables providing a light emitting indicator that can provide different and/or combined colors simultaneously in various areas of the matrix. As can be appreciated combined colors can be produced by illuminating different color LEDs and at different intensities so as to achieve different shades of colors based on combined colors. In addition in some example embodiments, each LED can be controlled independently so as to produce a range of combined colors or a varying continuum of different and/or combined colors in different areas of the matrix. Further as can be appreciated, variations between single colors and multiple combined colors may also be provided based on the LEDs illuminated and the intensity thereof. Further in some embodiments an LED matrix that has substantial numbers of LEDs in both the X and Y direction may be provided to provide a relatively wide display. Alternatively in other embodiments generally thin and linearly arranged groups of LEDs may be positioned to provide a relatively long and thin arrangement of LEDs. This may be desirable, for example, in some locations adjacent to transaction function areas of an automated banking machine where limited space for indicators is available. In addition in some embodiments matrices of LEDs may be interposed or superimposed over one another so as to provide more densely packed color outputs or variations in combined colors or other features. Of course these approaches are merely examples and in other embodiments other approaches may be used.

Figure 3:
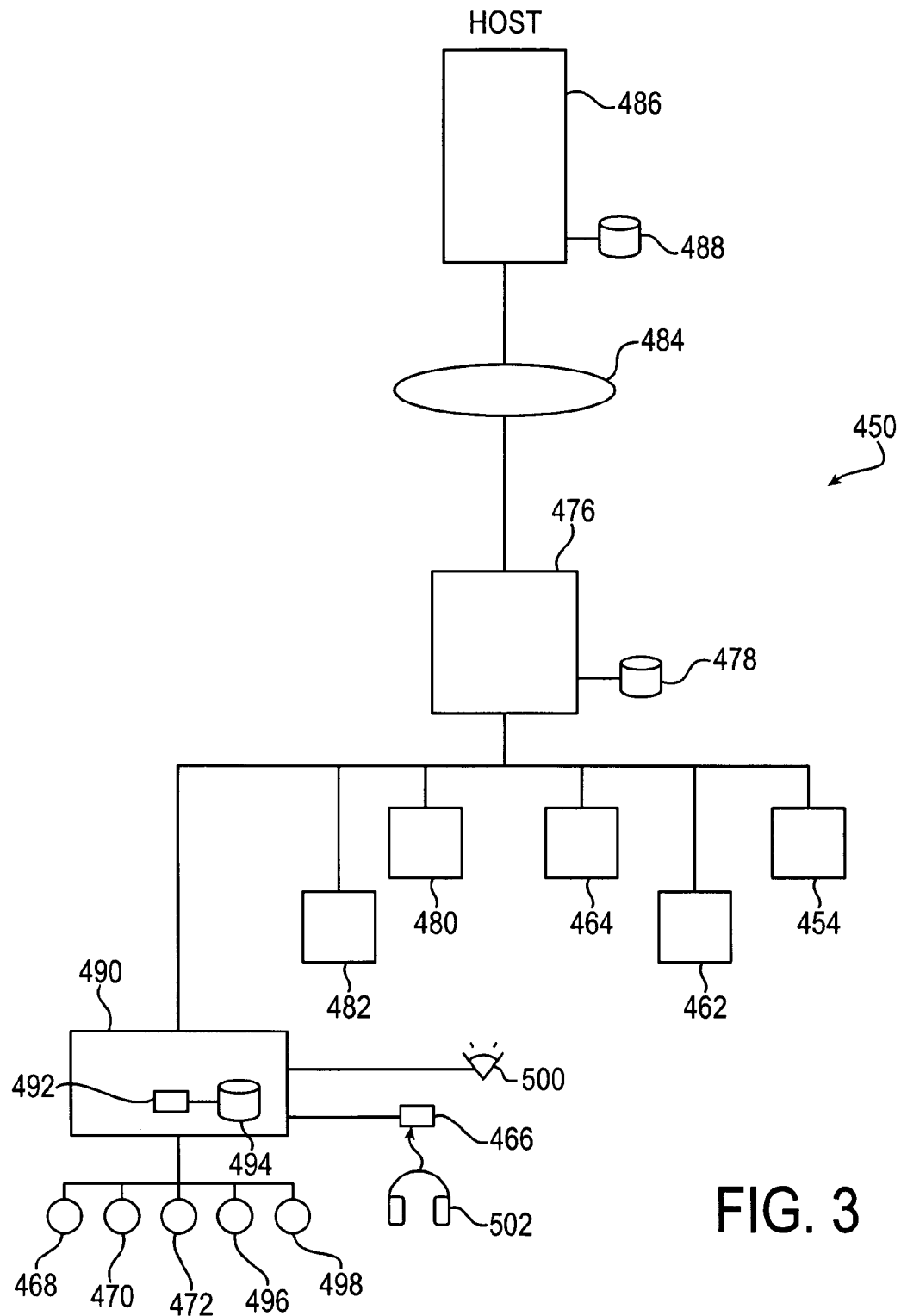
FIG. 3 is a schematic view of an automated banking machine and system which includes an embodiment of device indicators.

FIG. 3 shows schematically an automated banking machine system of an embodiment. In this schematic representation machine 450 includes a terminal processor 476 associated with the machine. Terminal processor 476 which may alternatively referred to herein as a computer, executes programmed instructions that are stored in one or more data stores schematically indicated 478. In the embodiment the terminal processor 476 is in operative communication with and controls the operation of numerous devices of the machine. These devices include the display 454 and the auxiliary display 464. The terminal processor 476 is also in operative connection with the keypad 462. The terminal processor is also in operative connection with a receipt printer 480 which operates to print the receipts that are delivered to users through the receipt opening 460. The terminal processor 476 is also in operative connection with one or more transaction function devices 482 that are operated to carry out transactions. Different example embodiments of automated banking machines include different types of devices. Different types of devices enable an automated transaction machine to carry out different types of transactions. For example, some types of automated machines include a depository for accepting deposits while other automated machines do not. Some machines have a "touch screen" while others have separate displays and input buttons. Automated banking machines can also be fitted with devices such as cash and coin acceptors, statement printers, check validators, currency bill or note acceptors, thumb print readers, and other types of devices, while other machines do not include such devices. Still other types of transaction function devices such as devices for receiving or delivering coupons, tickets, scrip or other sheet-like items may be included in the machine. Of course it should be understood that the devices shown in machine 450 are merely examples and in other embodiments other or different types and arrangements of devices may be used.

The automated banking machine 450 is operative to communicate through one or more networks schematically indicated 484 with one or more remote computers. In the embodiment shown, the automated banking machine communicates with a remote computer 486 which comprises a financial transaction authorizing host. The computer 486 is in operative connection with one or more data stores 488. Data stores 488 include computer executable instructions as well as other data that can be used to determine whether to authorize transactions requested to be carried out at the machine. For example in an embodiment card data read from user cards and/or other identifying data which can be used to identify a user's account, is sent from the machine 450 to the remote computer 486. The account identifying data may be accompanied by other data which indicates the nature of a transaction that a user wishes to conduct at the machine. The example computer 486 operates to determine if the card data and/or other data received from the machine corresponds to a financial account which is authorized to conduct the transaction that has been requested by the user at the machine. The host computer 486 does this by comparing data received at the machine to stored data held in the one or more data stores 488. By making a determination that the requested transaction is authorized, the computer 486 communicates with the machine to enable the machine to carry out the user's requested transaction. This may include for example a transaction which involves a transfer of funds or other value either to or from the user. For example the machine may operate to dispense to the user of the machine an amount of cash having an associated value. In response to the machine operating to provide the user with the requested transaction, the host 486 operates to cause the user's account to be assessed for the value of the cash dispensed. In other embodiments the machine and remote computer may operate to cause accounts to be credited with value received at the machine or otherwise transferred through operation of the machine. Of course it should be understood that in other embodiments the machine may operate to carry out transactions through communication with numerous different networks and remote computers so as to authorize transactions and/or to cause transfers to or from user accounts.

In an example embodiment, the machine 450 includes an indicator controller 490. Indicator controller 490 is in operative connection with the terminal processor 476 and communicates therewith. The indicator controller 490 includes an indicator processor 492 which is in operative connection with one or more data stores 494. In some embodiments the indicator controller may include a programmable system on chip (PSoC). The data store 494 in operative connection with the indicator processor includes processor executable instructions and data that enable the indicator controller to provide controlled outputs through the indicators such as indicators 468, 470 and 472, as well as other visual indicators that may be included on the machine 450 which are schematically indicated 496 and 498.

The example indicator controller 490 is in operative connection with one or more sensors. The sensors may include an ambient light sensor schematically indicated 500. Further in the example embodiment the indicator controller 490 is in operative connection with the port 466 which can be in selectively operative connection with devices such as headphones schematically indicated 502. Of course it should be understood that these sensors and connections with the indicator controller are example and in other embodiments other connections, sensors or other items which provide inputs to the indicator controller may be used. Further it should be understood that although in the embodiment some functions carried out by the indicator controller are caused to be carried out, operationally modified or otherwise effected by sensors in operative connection directly with the indicator controller, in other embodiments such sensors may be in connection with the terminal processor 476 or other controllers associated with the machine and inputs from such other controllers may cause or change indicator outputs.

In an example embodiment, the indicator controller 490 operates to provide numerous different types of visible outputs through the indicators 468, 470, 472 responsive to communication with the terminal processor 476 and/or other devices. For example in some embodiments the indicator controller 490 may operate in accordance with its programmed instructions to provide intermittent illumination of selected indicators. The indicator controller 490 may operate to output various degrees of indicator brightness, different indicator shades of colors, different indicator illumination frequencies and varying levels of indicator brightness in response to stored programmed instructions.

In some example embodiments, the indicator controller 490 may operate responsive to the terminal processor 476 to guide a user to use their hand to contact a particular device or transaction location. For example when the machine is sitting idle waiting for a user to input their card, the terminal processor may cause the indicator controller to periodically illuminate the indicator adjacent to the card reader slot. Such illumination may guide the user to the area of the card reader slot so that they can more readily find it and insert their card. Similarly when a user has requested a transaction that includes placing sheets into or receiving sheets from the opening 458, the terminal processor 476 and the indicator controller 490 may cause the indicator 472 adjacent thereto to periodically illuminate. Similarly indicator 470 may be operated to periodically illuminate when a receipt has been printed and is presented to the user through the receipt opening. Of course other indicators may be operated so as to guide a user in operation of the machine or to draw a user's attention to a particular location on the machine based on the programming associated with the terminal processor or the indicator controller. It should be understood that in some embodiments the periodic illumination may include flashing of the LEDs when a user's attention is sought at a particular location on the machine, while in other embodiments the periodic illumination may include continuous illumination during the time it is desired to attract a user's attention to a given area. In some embodiments the indicator controller may also selectively vary the nature of the outputs in accordance with its programmed instructions. For example in some machines it may be desirable to selectively control the brightness of the indicators 468, 470, 472 under certain circumstances. The example indicator controller 490 may operate in accordance with its programming to vary the length of time that power is supplied to particular LEDs so as to vary the brightness of the indicator. For example by providing a pulse width modulated output to a selected LED, which effectively varies the time period that the LED is illuminated, the brightness of the LED may be controlled. In an embodiment supplying power for a shorter period of the overall duty cycle period that the LEDs are to be perceived as illuminated provides a lower brightness. Likewise providing power to the LEDs for a longer period of the duty cycle provides a higher brightness. As can be appreciated the LEDs are provided with power by the indicator controller only at periodic intervals during the period that the indicator is to be perceived by a user as illuminated. By varying the duty cycle during which power is supplied, the perceived brightness of the indicator is controlled. Further in some embodiments the indicator controller may also operate to begin with outputs at a lower perceived brightness and then change over time to a higher perceived brightness. This might be done for example in a situation where an item is being delivered to a user from a machine in a particular location. In such circumstances the associated indicator may be perceived to flash or be continuously illuminated initially at a lower brightness and then as time passes the flashing or continuous brightness may increase. Alternatively or in addition, in other embodiments the brightness output may initially be high and then be controlled through changes in the duty cycle of the pulse width modulation to decrease the brightness. Of course these approaches are example.

In still other example embodiments, the indicator controller 490 may operate in accordance with its programming to control the indicators 468, 470, 472 responsive at least in part to conditions sensed at the machine 450. For example the indicator controller 490 may be in operative connection with the light sensor 500 which senses the level of ambient light at the machine. If the level of ambient light is high such as when the sensor senses that the machine is in direct sunlight, the indicator controller 490 may operate in accordance with its programming to cause high brightness outputs from the indicators 468, 470, 472 of the machine 450. Thus in direct sunlight the indicators are more likely to be seen by the user if the outputs are of the highest brightness. Further in some embodiments the indicator controller may operate responsive to sensed level of ambient light to output a color from the indicators that is more likely to be seen by the user in bright sunlight. This might include for example a bright color that contrasts with the area of the ATM's fascia surrounding the indicator. Further in the embodiments the indicator controller may operate to change the perceived frequency of flashing illumination of an indicator responsive to the level of ambient light. For example the indicator controller 490 may operate to cause the indicator to flash periodically in a controlled regular or irregular pattern designed to attract a user's attention to the area of the indicator. Similarly when the ambient light sensor senses lower light level, the indicator controller 490 may operate in accordance with its programming to control the level of illumination to provide a softer, less bright output through the indicator. In addition the indicator controller may operate to provide one or more different blended colors that are produced by the combined illumination of the two, three or other different color LEDs that are used in the indicator matrix. Further the indicator controller 490 may provide varying blended colors either continuously or intermittently responsive to conditions sensed or in a manner that is considered desirable to convey information about device operation. Of course these approaches are example and in other embodiments other approaches may be used.

In still other embodiments the indicator controller may operate to provide other effects through the indicators in connection with operation of the machine. For example the indicator controller 490 may operate in accordance with its programming to provide continuous or periodic illumination of an indicator with outputs of varying colors. In an arrangement where the indicator is continuously illuminated, the indicator controller 490 may operate to gradually change the indicator between various shades of color and/or brightness. Such features may be used to attract the user's attention to the transaction areas of the machine and/or may also provide aesthetically pleasing color changing features which users may find attractive. Further in some embodiments the indicators may be continuously or periodically illuminated and provide output coloration in a coordinated manner so as to provide an aesthetically attractive appearance of the machine. Other embodiments may provide for varying coloration and illumination that occurs without device operation so as to draw a user's attention to the particular machine because of the different colors and illumination characteristics. Further in other embodiments when a machine is not conducting transactions attractive arrangements of "dancing lights" or other changing indicator color characteristics may be utilized to draw a user's attention to the machine. In addition when not conducting transactions, the machine may output audible sounds, such as music. The indicator controller and the terminal processor may operate to control the indicators so that they illuminate and change color in a variable manner that corresponds to the audible outputs. Further in some embodiments the indicator controller 490 may provide outputs through one or both displays 454, 464 that are coordinated with the illumination of the indicators so as to provide an overall aesthetic appearance that is attractive and encourages people to utilize the machine. Of course these approaches are mere examples and in other embodiments other approaches may be used.

In still other example embodiments the indicators 468, 470, 472 may be operated responsive to the indicator controller 490 and/or the terminal processor 476 to provide outputs that correspond to functional status and/or capabilities associated with the machine. For example in some embodiments if the machine is broken the indicators may provide outputs that are indicative thereof. For example in some embodiments if the machine is not operational the indicators 468, 470, 472 may provide a periodic or continuous red color to indicate that the machine is out of order. Further in such arrangements the display or displays on the machine may output an indication that the machine is "out of order."

Further in still other embodiments various indicators may be operated to advise a user of the status of the particular devices in the machine. For example in some embodiments the indicator may be associated with an opening that is used by the machine to accept checks. If the check acceptor of the machine has malfunctioned the particular indicator that is associated with the check acceptor may operate in accordance with its programming to provide an indication that the check acceptor is not operational. This might include for example a continuous or periodic visible output of red light in connection with the indicator adjacent the check acceptor slot. Other transaction function areas may have indicators that provide different types of outputs to indicate to a user that they are operational. Various types of indicator outputs may be used to provide different types of indications that are indicative of the status of the machine or devices included in the machine.

In still other example embodiments, the terminal processor 476 and/or indicator controller 490 may operate in accordance with its programming to change the operation of the indicators in response to other sensed conditions. For example if a blind user is operating the machine based on audible instructions it may be undesirable to operate the visible indicators to guide a user to the particular device interfaces on the machine. Such voice guidance instructions for an automated banking machine may be carried out in a manner like that described in U.S. Pat. No. 8,469,266; the disclosure of which is incorporated herein by reference in its entirety.

In some embodiments the indicator controller 490 may operate in accordance with its programming to detect the operative connection of headphones 502 with the headphone jack or other port 466 on the machine. Responsive to detecting the connection of headphones which indicates that a user who operates the machine in response to voice guidance is at the machine, the indicator controller may operate in accordance with its programming to stop the illumination of the indicators. The cessation of such indicators may be useful in that it avoids indicating to criminals who may be nearby the type of transaction the blind user is conducting or the status of the user's particular transaction. For example in some embodiments it may be desirable to avoid having the indicator adjacent to the cash dispenser illuminate when a blind user has been presented with cash to be taken from the cash dispenser opening. This way a criminal who is observing the transaction will not know that the cash dispenser has operated to present the user with cash. Likewise by operating the controller to not illuminate the indicators in association with card reading, cash accepting or other functions, remote observation of machine devices by criminals can be avoided and the risk of the blind user being robbed at the machine may be reduced.

In still other embodiments the programming associated with the voice guidance capabilities and the terminal processor 476 may operate to provide a voice guidance user with the option to utilize the indicators or to control the indicators in ways that will facilitate a user's operation of the machine. For example in some embodiments users with limited sight may be provided with an audible message to advise them that they have the option to have the visual indicators turned off during their transaction or to have the visual indicators operate in the normal manner. Further in still other embodiments the user may be given an audible instruction indicating that they can modify the operation of the visual indicators 468, 470, 472 to provide brighter or other changed outputs to help a user with limited sight to carry out their transaction. Thus the machine may operate in accordance with its programming to prompt a user to provide one or more inputs which enable the user to select whether they wish to have the visual indicators operate or not operate during their transaction. Further in still other embodiments the user may be given options to provide inputs that increase the intensity of the indicators so as to guide the user to the transaction area. Further the user may also be provided options to change not only the perceived brightness, frequency, patterns or other properties of the indicators, but the users may also be given selections to modify coloration or other indicator output properties. In the embodiment the user may provide one or more manual inputs such as inputs to the keypad in response to prompts given via audible messages output through the port so that the user can selectively shut off the indicators, operate selected indicators, change the color, brightness, timing, nature or intensity of the indicator outputs or do other things as may be helpful in connection with the user's transaction as are made available through the programming of the indicator controller and the terminal processor. Of course it should be understood that these approaches are example and in other embodiments other approaches may be used.

In an example embodiment of the automated banking machine 450 is also operative to draw a user's attention at appropriate times to the card reader slot 456. Machine 450 also includes features to minimize the risk of unauthorized interception of card data by persons who may attempt to install an unauthorized card reading device on the machine.

The example embodiments of the automated transaction machines and systems described herein have been described with reference to particular software components and features. Other embodiments may include other or different software components which provide similar functionality.

Thus, the features and characteristics of the example embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

It should be understood that language which refers to a list of items such as "at least one of A, B or C" (Example 1) means "at least one of A, B and/or C." Likewise it should be understood that language which refers to a list of items such as "at least one of A, B and C" (Example 2) means "at least one of A, B and/or C." The list of items in Example 2 is intended not to require one of each item. The lists of items in both Examples 1 and 2 can mean "only one item from the list or any combination of items in the list." That is, the list of items (in both Examples 1 and 2) can mean only A, or only B, or only C, or any combination of A, B and C (e.g., AB, AC, BC, or ABC).

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

The invention claimed is:

1. An apparatus comprising:
    an automated banking machine that operates responsive at least in part to data read from data bearing records, the automated banking machine including
    a plurality of transaction function devices, the plurality of transaction function devices includes a first transaction function device that is a card reader, wherein the card reader is operable to read data from cards that is usable to identify financial accounts, and a second transaction function device that is operable to at least one of a group consisting of dispense sheets, receive sheets, and dispense and receive sheets;
    a plurality of slots, the plurality of slots include a card slot, wherein the card slot is associated with the card reader and wherein cards are moved in the card slot during operation of the machine, and a sheet opening associated with the second transaction function device wherein sheets are at least one of dispensed or received through the sheet opening;
    a plurality of indicators that includes a first indicator adjacent to the card slot, the first indicator includes at least three different color light emitting diodes (LEDs), and a second indicator adjacent to the sheet opening, the second indicator includes at least three different color LEDs;
    an indicator processor in operative connection with the plurality of indicators;
    wherein the indicator processor is operable to cause the LEDs of the first and second indicators to intermittently illuminate to produce a plurality of blended colors that correspond to a functional status of the first and second transaction function devices respectively;
    a display;
    a user input device; and
    a terminal processor associated with the machine, wherein the at least one terminal processor is operable to cause a determination to be made that card data read from a user card corresponds to a financial account that is authorized to have a financial transaction conducted thereon through operation of the machine, responsive at least in part to the determination, cause a financial transfer involving the financial account;
    wherein the terminal processor is operable to cause the indicator processor to cause the LEDs of the first and second indicators to operate in a coordinated manner with operation of the first and second the transaction function devices.

2. The apparatus set forth in claim 1, wherein the indicator processor is operable to cause the LEDs of a selected one of the plurality of indicators to intermittently illuminate to produce a plurality of different brightness outputs.

3. The apparatus set forth in claim 1, wherein the indicator processor is operable to cause the LEDs of a selected one of the plurality of indicators to intermittently illuminate at a plurality of different frequencies in visual spectrum of light.

4. The apparatus set forth in claim 1, wherein the indicator processor is operable to cause the LEDs of a selected one of the plurality of indicators to produce time varying multiple color outputs.

5. The apparatus set forth in claim 1, wherein the indicator processor is operative to vary brightness of at least one respective LED by varying the duration that power is delivered to the respective LED.

6. The apparatus set forth in claim 5, wherein the indicator processor is operative to vary brightness of a respective LED by pulse width modulation of the power to the respective LED and varying the duty cycle of the power supplied.

7. The apparatus set forth in claim 1, the automated banking machine further comprising an ambient light sensor,
    wherein the ambient light sensor is operable to sense ambient light levels external of the machine, wherein the ambient light sensor is in operative connection with the indicator processor,
    wherein the indicator processor is operable to control the LEDs of a selected one of the plurality of indicators to selectively vary one of a group consisting of blended colors visual flash frequencies, LED output brightness, or any combination of blended colors, visual flash frequencies and LED output brightness responsive at least in part to sensed ambient light level.

8. The apparatus set forth in claim 1, the automated banking machine further comprising a port,
    wherein the port is releasibly connectable with an audio output device,
    wherein the indicator processor is operable to cause responsive at least in part to detecting a connection of the audio output device with the device port, to cause the plurality of indicators to cease providing outputs.

9. The apparatus set forth in claim 1, wherein responsive to a user input through a user input device of the indicator processor is operable to change the operation of a selected one of the plurality of indicators.

10. The apparatus set forth in claim 1, the automated banking machine further comprising a port,
    wherein the port is releasibly connectable with an audio output device,
    the automated banking machine is operable to provide an audio output prompting a user to provide an input through a user input device of the automated banking machine to cause a change in at least one property of at least one visual output provided through a selected oen of the plurality of indicators.

11. The apparatus set forth in claim 1, wherein the indicator processor is operable to cause the LEDs of a selected one of the plurality of indicators to produce a predefined blended color to indicate that the one of a group consisting of the automated banking machine and the transaction function device is inoperable.

12. An apparatus comprising:
an automated banking machine that operates responsive at least in part to data read from data bearing records, the automated banking machine including
a transaction function device;
a slot associated with the transaction function device;
an indicator adjacent to the slot, the indicator includes at least three different color light emitting diodes (LEDs); and
an indicator processor in operative connection with the indicator;
wherein the indicator processor is operable to cause the LEDs of the indicator to intermittently illuminate to produce a plurality of blended colors that correspond to a functional status of the transaction function device; and
wherein the indicator processor is operable to cause the LEDs of the at least one indicator to intermittently illuminate to produce a plurality of different brightness outputs.

13. The apparatus set forth in claim 12, wherein the transaction function device is selected from a group consisting of a card reader, a sheet dispenser, a sheet acceptor, and a receipt printer.

14. The apparatus set forth in claim 12, wherein the indicator processor is operable to cause the LEDs of the indicator to intermittently illuminate at a plurality of different frequencies in visual spectrum of light.

15. The apparatus set forth in claim 12, wherein the indicator processor is operable to cause the LEDs of the indicator to produce time varying multiple color outputs.

16. The apparatus set forth in claim 12, wherein the indicator processor is operative to vary brightness of at least one respective LED by varying the duration that power is delivered to the respective LED.

17. The apparatus set forth in claim 16, wherein the indicator processor is operative to vary brightness of a respective LED by pulse width modulation of the power to the respective LED and varying the duty cycle of the power supplied.

18. The apparatus set forth in claim 12, the automated banking machine further comprising an ambient light sensor,
wherein the ambient light sensor is operable to sense ambient light levels external of the machine, wherein the ambient light sensor is in operative connection with the indicator processor,
wherein the indicator processor is operable to control the LEDs of the indicator to selectively vary one of a group consisting of blended colors visual flash frequencies, LED output brightness, or any combination of blended colors, visual flash frequencies and LED output brightness responsive at least in part to sensed ambient light level.

19. The apparatus set forth in claim 12, the automated banking machine further comprising a port,
wherein the port is releasibly connectable with an audio output device,
wherein the indicator processor is operable to cause responsive at least in part to detecting a connection of the audio output device with the device port, to cause the indicator to cease providing outputs.

20. The apparatus set forth in claim 12, wherein responsive to a user input through a user input device of the indicator processor is operable to change the operation of the indicator.

21. The apparatus set forth in claim 12, the automated banking machine further comprising a port,
wherein the port is releasibly connectable with an audio output device,
the automated banking machine is operable to provide an audio output prompting a user to provide an input through a user input device of the automated banking machine to cause a change in at least one property of at least one visual output provided through the indicator.

22. The apparatus set forth in claim 12, wherein the indicator processor is operable to cause the LEDs of the indicator to produce a predefined blended color to indicate that the one of a group consisting of the automated banking machine and the transaction function device is inoperable.

23. An apparatus comprising:
an automated banking machine that operates responsive at least in part to data read from data bearing records, the automated banking machine including
a transaction function device;
a slot associated with the transaction function device;
an indicator adjacent to the slot, the indicator includes at least three different color light emitting diodes (LEDs); and
an indicator processor in operative connection with the indicator;
wherein the indicator processor is operable to cause the LEDs of the indicator to intermittently illuminate to produce a plurality of blended colors that correspond to a functional status of the transaction function device; and
wherein the indicator processor is operable to cause the LEDs of the indicator to produce time varying multiple color outputs.

24. The apparatus set forth in claim 23, wherein the transaction function device is selected from a group consisting of a card reader, a sheet dispenser, a sheet acceptor, and a receipt printer.

25. The apparatus set forth in claim 23, wherein the indicator processor is operable to cause the LEDs of the indicator to intermittently illuminate at a plurality of different frequencies in visual spectrum of light.

26. The apparatus set forth in claim 23, wherein the indicator processor is operative to vary brightness of at least one respective LED by varying the duration that power is delivered to the respective LED.

27. The apparatus set forth in claim 26, wherein the indicator processor is operative to vary brightness of a respective LED by pulse width modulation of the power to the respective LED and varying the duty cycle of the power supplied.

28. The apparatus set forth in claim 23, the automated banking machine further comprising an ambient light sensor,
wherein the ambient light sensor is operable to sense ambient light levels external of the machine, wherein the ambient light sensor is in operative connection with the indicator processor,
wherein the indicator processor is operable to control the LEDs of the indicator to selectively vary one of a group consisting of blended colors visual flash frequencies, LED output brightness, or any combination of blended colors, visual flash frequencies and LED output brightness responsive at least in part to sensed ambient light level.

29. The apparatus set forth in claim 23, the automated banking machine further comprising a port,
wherein the port is releasably connectable with an audio output device,
wherein the indicator processor is operable to cause responsive at least in part to detecting a connection of the audio output device with the device port, to cause the indicator to cease providing outputs.

30. The apparatus set forth in claim 23, wherein responsive to a user input through a user input device of the indicator processor is operable to change the operation of the indicator.

31. The apparatus set forth in claim 23, the automated banking machine further comprising a port,
wherein the port is releasably connectable with an audio output device,
the automated banking machine is operable to provide an audio output prompting a user to provide an input through a user input device of the automated banking machine to cause a change in at least one property of at least one visual output provided through the indicator.

32. The apparatus set forth in claim 23, wherein the indicator processor is operable to cause the LEDs of the indicator to produce a predefined blended color to indicate that the one of a group consisting of the automated banking machine and the transaction function device is inoperable.

33. An apparatus comprising:
an automated banking machine that operates responsive at least in part to data read from data bearing records, the automated banking machine including
a transaction function device;
a slot associated with the transaction function device;
an indicator adjacent to the slot, the indicator includes at least three different color light emitting diodes (LEDs); and
an indicator processor in operative connection with the indicator;
wherein the indicator processor is operable to cause the LEDs of the indicator to intermittently illuminate to produce a plurality of blended colors that correspond to a functional status of the transaction function device; and
wherein the indicator processor is operative to vary brightness of at least one respective LED by varying the duration that power is delivered to the respective LED.

34. The apparatus set forth in claim 33, wherein the transaction function device is selected from a group consisting of a card reader, a sheet dispenser, a sheet acceptor, and a receipt printer.

35. The apparatus set forth in claim 33, wherein the indicator processor is operable to cause the LEDs of the indicator to intermittently illuminate at a plurality of different frequencies in visual spectrum of light.

36. The apparatus set forth in claim 33, wherein the indicator processor is operative to vary brightness of a respective LED by pulse width modulation of the power to the respective LED and varying the duty cycle of the power supplied.

37. The apparatus set forth in claim 33, the automated banking machine further comprising an ambient light sensor,
wherein the ambient light sensor is operable to sense ambient light levels external of the machine, wherein the ambient light sensor is in operative connection with the indicator processor,
wherein the indicator processor is operable to control the LEDs of the indicator to selectively vary one of a group consisting of blended colors visual flash frequencies, LED output brightness, or any combination of blended colors, visual flash frequencies and LED output brightness responsive at least in part to sensed ambient light level.

38. The apparatus set forth in claim 33, the automated banking machine further comprising a port,
wherein the port is releasably connectable with an audio output device,
wherein the indicator processor is operable to cause responsive at least in part to detecting a connection of the audio output device with the device port, to cause the indicator to cease providing outputs.

39. The apparatus set forth in claim 33, wherein responsive to a user input through a user input device of the indicator processor is operable to change the operation of the indicator.

40. The apparatus set forth in claim 33, the automated banking machine further comprising a port,
wherein the port is releasably connectable with an audio output device,
the automated banking machine is operable to provide an audio output prompting a user to provide an input through a user input device of the automated banking machine to cause a change in at least one property of at least one visual output provided through the indicator.

41. The apparatus set forth in claim 33, wherein the indicator processor is operable to cause the LEDs of the indicator to produce a predefined blended color to indicate that the one of a group consisting of the automated banking machine and the transaction function device is inoperable.

42. An apparatus comprising:
an automated banking machine that operates responsive at least in part to data read from data bearing records, the automated banking machine including
a transaction function device;
a slot associated with the transaction function device;
an indicator adjacent to the slot, the indicator includes at least three different color light emitting diodes (LEDs);
an indicator processor in operative connection with the indicator; and
a port;
wherein the indicator processor is operable to cause the LEDs of the indicator to intermittently illuminate to produce a plurality of blended colors that correspond to a functional status of the transaction function device;
wherein the port is releasably connectable with an audio output device; and
wherein the automated banking machine is operable to provide an audio output prompting a user to provide an input through a user input device of the automated banking machine to cause a change in at least one property of at least one visual output provided through the indicator.

43. The apparatus set forth in claim 42, wherein the transaction function device is selected from a group consisting of a card reader, a sheet dispenser, a sheet acceptor, and a receipt printer.

44. The apparatus set forth in claim 42, wherein the indicator processor is operable to cause the LEDs of the indicator to intermittently illuminate at a plurality of different frequencies in visual spectrum of light.

45. The apparatus set forth in claim 42, wherein the indicator processor is operative to vary brightness of a respective LED by pulse width modulation of the power to the respective LED and varying the duty cycle of the power supplied.

46. The apparatus set forth in claim 42, the automated banking machine further comprising an ambient light sensor, wherein the ambient light sensor is operable to sense ambient light levels external of the machine, wherein the ambient light sensor is in operative connection with the indicator processor, wherein the indicator processor is operable to control the LEDs of the indicator to selectively vary one of a group consisting of blended colors visual flash frequencies, LED output brightness, or any combination of blended colors, visual flash frequencies and LED output brightness responsive at least in part to sensed ambient light level.

47. The apparatus set forth in claim 42, the automated banking machine further comprising a port, wherein the port is releasibly connectable with an audio output device, wherein the indicator processor is operable to cause responsive at least in part to detecting a connection of the audio output device with the device port, to cause the indicator to cease providing outputs.

48. The apparatus set forth in claim 42, wherein responsive to a user input through a user input device of the indicator processor is operable to change the operation of the indicator.

49. The apparatus set forth in claim 42, wherein the indicator processor is operable to cause the LEDs of the indicator to produce a predefined blended color to indicate that the one of a group consisting of the automated banking machine and the transaction function device is inoperable.

50. An apparatus comprising:
an automated banking machine that operates responsive at least in part to data read from data bearing records, the automated banking machine including
a transaction function device;
a slot associated with the transaction function device; and
an indicator adjacent to the slot, the indicator includes at least three different color light emitting diodes (LEDs);
an indicator processor in operative connection with the indicator;
wherein the indicator processor is operable to cause the LEDs of the indicator to intermittently illuminate to produce a plurality of blended colors that correspond to a functional status of the transaction function device; and wherein the indicator processor is operable to cause the LEDs of the indicator to produce a predefined blended color to indicate that the one of a group consisting of the automated banking machine and the transaction function device is inoperable.

51. The apparatus set forth in claim 50, wherein the transaction function device is selected from a group consisting of a card reader, a sheet dispenser, a sheet acceptor, and a receipt printer.

52. The apparatus set forth in claim 50, wherein the indicator processor is operable to cause the LEDs of the indicator to intermittently illuminate at a plurality of different frequencies in visual spectrum of light.

53. The apparatus set forth in claim 50, wherein the indicator processor is operative to vary brightness of a respective LED by pulse width modulation of the power to the respective LED and varying the duty cycle of the power supplied.

54. The apparatus set forth in claim 50, the automated banking machine further comprising an ambient light sensor, wherein the ambient light sensor is operable to sense ambient light levels external of the machine, wherein the ambient light sensor is in operative connection with the indicator processor, wherein the indicator processor is operable to control the LEDs of the indicator to selectively vary one of a group consisting of blended colors visual flash frequencies, LED output brightness, or any combination of blended colors, visual flash frequencies and LED output brightness responsive at least in part to sensed ambient light level.

55. The apparatus set forth in claim 50, the automated banking machine further comprising a port, wherein the port is releasibly connectable with an audio output device, wherein the indicator processor is operable to cause responsive at least in part to detecting a connection of the audio output device with the device port, to cause the indicator to cease providing outputs.

56. The apparatus set forth in claim 50, wherein responsive to a user input through a user input device of the indicator processor is operable to change the operation of the indicator.

* * * * *